United States Patent [19]
Riikonen

[11] Patent Number: 5,207,409
[45] Date of Patent: May 4, 1993

[54] INTERCHANGEABLE PINCH VALVE SYSTEM

[76] Inventor: Esko A. Riikonen, 10441 Waterfowl Ter., Columbia, Md. 21044

[21] Appl. No.: 895,691

[22] Filed: Jun. 9, 1992

[51] Int. Cl.⁵ .......................... F16K 7/06; G01R 27/00
[52] U.S. Cl. ........................................... 251/7; 251/4; 137/551; 324/716; 324/557
[58] Field of Search .................. 251/4, 6, 7, 9; 137/551; 73/7; 324/699, 718, 716, 557

[56] References Cited

U.S. PATENT DOCUMENTS

| | | | |
|---|---|---|---|
| 3,197,173 | 7/1965 | Taubenheim | 251/7 x |
| 3,775,680 | 11/1973 | Egeland | 324/699 |
| 3,826,461 | 7/1974 | Summerfield et al. | 251/7 X |
| 3,831,085 | 8/1974 | Kratavil | 324/557 |
| 4,906,917 | 3/1990 | Olness et al. | 325/557 X |
| 5,036,287 | 7/1991 | Serwatzky | 324/718 X |

Primary Examiner—Martin P. Schwadron
Assistant Examiner—Kevin L. Lee
Attorney, Agent, or Firm—Morton J. Rosenberg; David I. Klein

[57] ABSTRACT

An interchangeable pinch valve system (10) is provided with a valve body (20) having a longitudinal dimension which is substantially identical to standard longitudinal dimensions for ball, gate and the like type valves of similar flow path diameter. The reduced longitudinal dimension of pinch valve system (10), as compared to prior art systems, is achieved by a flexible-walled tubular sleeve (50) having a pair of transversely directed folds (60, 62) which provide sufficient sleeve material to enable the pinch closing of the flow passage (52) without substantially stretching the tubular sleeve wall (51).
The valve body 20 is provided with a pair of recessed openings (22, 24) formed in the interior of valve body wall (21) in parallel spaced relation transverse to the fluid flow axis of the valve for receipt of the respective folds (62, 60), whereby the tubular sleeve (50) is in contiguous contact with the interior surface of valve body wall (21). This arrangement permits the fluid flow passage to occupy the maximum cross-sectional area of the through passage (25) of valve body (20). A pair of spaced electrodes (72, 74) is also provided at an interface between an interior coating layer of the tubular sleeve (50) to detect damage to the interior coating layer.

14 Claims, 2 Drawing Sheets

INTERCHANGEABLE PINCH VALVE SYSTEM

BACKGROUND OF THE INVENTION

1. Field Of The Invention

This invention directs itself to pinch valve systems for coupling with fluid flow lines. In particular, this invention directs itself to a pinch valve system which is a replacement for and interchangeable with ball, plug and gate type valves. Still further, this invention directs itself to pinch valve systems having a high temperature and pressure operating capacity and long service life. More in particular, this invention pertains to a pinch valve system having a flexible-walled sleeve wherein a pair of transverse folds are provided to allow the sleeve to be pinched closed without substantial stretching of the sleeve wall. Further, this invention directs itself to a pinch valve system wherein the valve body includes a pair of circular recesses for receiving the folded portions of the flexible-walled sleeve to permit the sleeve to be maintained in contiguous contact with the interior wall surface of the valve body.

2. PRIOR ART

Pinch valves are well known in the art. The best prior art known to the Applicant include U.S. Pat. Nos. 3,640,354; 3,965,925; 4,092,010; 4,108,418; 4,111,391; 4,191,358; 4,205,697; 4,310,140; 4,330,101; 4,345,735; 4,372,528; 4,642,833; and, 4,824,072.

Pinch valve systems are widely used because of their simplicity and low cost. In many prior art systems the pinch valve includes a straight tubular sleeve, which when pinched to close the valve causes stretching of the sleeve member. The stretching of the sleeve member is detrimental to the life of the sleeve and limits the use of reinforced sleeves, those sleeves having reinforcing cords or fibers incorporated therein. Reinforced sleeves are those wherein a fiber such as fiberglass, Kevlar, carbon fibers and the like, are utilized to strengthen the tubular sleeve for operation at high pressures and temperatures. Since the fibers are inelastic, they are usually woven to allow for some displacement in the direction in which the sleeve is to be stretched, but this is at a cost of sacrificing some of the strength which the reinforcing cord would otherwise provide.

Since the stretch of the reinforced sleeve is substantially limited, even with a stretch accommodating weave of the fibers, prior art systems require that the overall sleeve length must be made several times greater than the diameter of the sleeve if reasonable service life is to be achieved. Since the sleeve is typically coupled to the valve body on opposing ends, the longer the distance between the pinch point and the point of coupling to the valve body, the less stretch will be imposed on the sleeve. Thus, most manufacturers provide pinch type valves having a sleeve length on the order of three times their inner diameter. Due to this characteristic of prior art pinch type valves, they are typically much longer than other standard valves such as ball, gate or plug type valves, and cannot therefore be readily interchanged therewith. Thus, in applications which previously incorporated these other valve types, pinch type valves are not readily usable, without expensive modifications to the pipelines, since the pinch valves have not heretofore come in the standard lengths, as provided with these other valve types. The instant invention overcomes this deficiency by providing a flexible-walled tubular sleeve which can be substantially shorter in length than incorporated in prior art systems, and operated without substantial stretching of the sleeve wall. The pinch valve of the instant invention thereby being produceable in the dimensions which provide for interchangeability with ball, gate and plug type valve systems.

In other prior art systems such as that disclosed in U.S. Pat. No. 4,192,358 there is provided a flexible-walled sleeve having a plurality of transversely shaped folds of sufficient material to prevent over-extension of the sleeve when pinched. However, these plurality of folds form a corrugated configuration which consumes cross-sectional flow area and provides an irregular surface pattern which will introduce turbulence into the fluid flow passing through the valve structure. Such valve structures are particularly susceptible to damage caused by cavitation, or abrasion, when slurries are flowing therethrough.

SUMMARY OF THE INVENTION

An interchangeable pinch valve system is provided. The interchangeable pinch valve system includes a valve body having a flow axis defined by a longitudinally directed through passage formed by an interior wall thereof. The interchangeable pinch valve system further includes a flexible-walled tubular sleeve member disposed within the valve body through passage coaxial with the flow axis. The flexible-walled sleeve member is coupled to the valve body on opposing ends thereof to define an interruptible fluid flow path therebetween. The interchangeable pinch valve system additionally includes a pinching mechanism for pinching an intermediate portion of the tubular sleeve member to interrupt the fluid flow path. The tubular sleeve member is in contiguous contact with the interior wall of the valve body and includes a pair of outwardly extending transverse folds formed in the flexible wall on opposing longitudinal ends of the intermediate portion of the tubular sleeve member, whereby the fluid flow path can be pinched closed without substantial stretch of the tubular sleeve member flexible wall.

DESCRIPTION OF THE PREFERRED EMBODIMENTS

Figure 1:
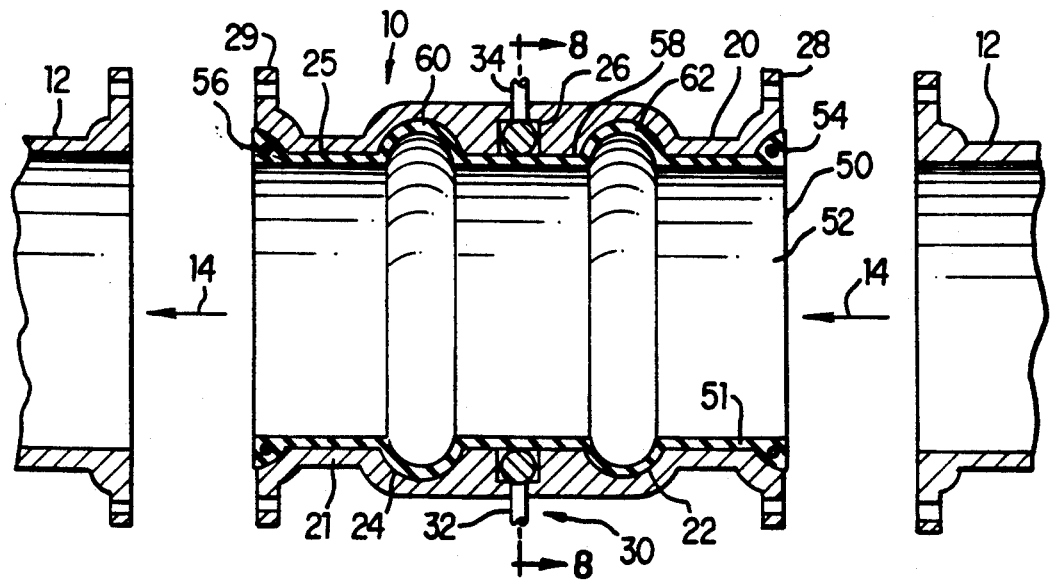
FIG. 1 is a cross-sectional plan view of the pinch valve system.
Figure 2:
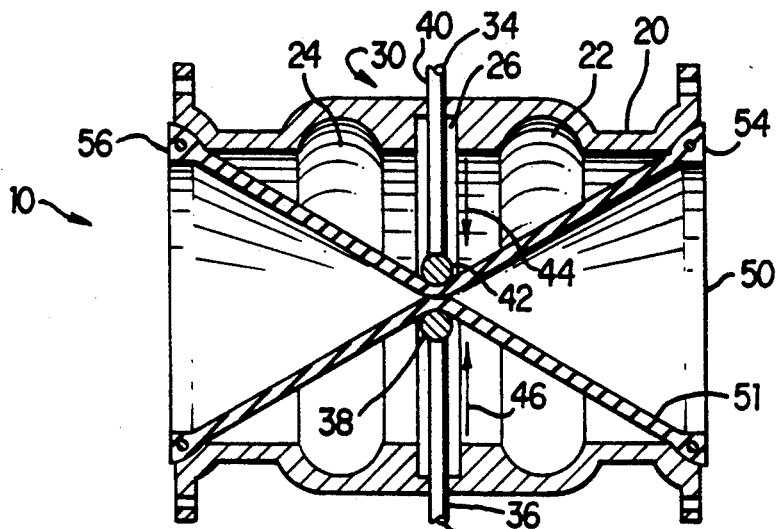
FIG. 2 is a cross-sectional view of the pinch valve system shown with the sleeve member pinched closed.
Figure 6:
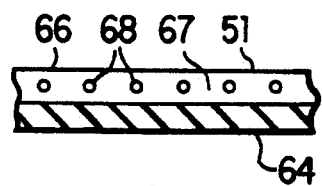
FIG. 6 is a cut-away sectional view of a portion of the flexible-walled sleeve.

Referring now to FIGS. 1, 2 and 6, there is shown interchangeable pinch valve system 10 for interchangeably replacing ball, plug, diaphragm, butterfly or gate type valves of equal flow path diameter. As will be seen in following paragraphs, interchangeable pinch valve system 10 is specifically directed to the concept of providing a pinch valve having a pair of transverse folds 60, 62 which permits the longitudinal length of the valve body 20 to be manufactured to the standard dimensions utilized for ball, plug, diaphragm, butterfly and gate type valves. Further, high pressure operation is achieved utilizing a multilayer, reinforced tubular sleeve 50, which is pinched closed without substantially stretching the sleeve wall 51. Although the design features of interchangeable pinch valve system 10 provide for long life of the tubular sleeve 50, means are provided for detecting deterioration of the interior layer of the tubular sleeve in the intermediate portion 58 of sleeve 50.

As will be seen in following paragraphs, interchangeable pinch valve system 10 is particularly adapted for being sealingly coupled to a fluid flow line 12 for forming an interruptible fluid flow path. The valve body 20 is formed by a substantially cylindrical wall 21 whose interior defines a through passage 25, the longitudinal direction of the through passage 25 defining a valve flow axis, shown by directional arrows 14. Valve body 20 is provided with a pair of coupling flanges 28, 29 on opposing longitudinal ends thereof. Respective flanges 28 and 29 are formed in a configuration well known in the art for coupling with standard fluid flow lines 12. Within the through passage 25 a flexible-walled tubular sleeve 50 is disposed coaxial the fluid flow axis, the interior thereof defining a fluid flow passage 52. On opposing ends of tubular sleeve 50 there is provided integrally formed flanges 54 and 56 for coupling to opposing ends of valve body 20. The integrally formed flanges 54 and 56 further provide a gasket type seal between the respective flanges 28, 29 of valve body 20 and the flanges of the fluid flow lines 12.

As shown in FIG. 2, the fluid flow path through valve 10 is interruptible by means of the pinch bar assembly 30. Pinch bar assembly 30 includes a pair of valve closing members 32, 34 which are displaced in opposing directions, as indicated by directional arrows 44 and 46, to pinch together opposing sides of the intermediate portion 58 of sleeve 50. Valve closing members 32, 34 each include a respective shaft portion 36, 40 and a pressure applying portion 38, 42. Shaft portions 36, 40 are coupled to actuator mechanisms (not shown) which displace the value closing members 32, 34 utilizing a manual, hydraulic, pneumatic, or electrical system, well known in the art.

While the tubular sleeve 50 may be formed of an elastic material composition, and thus be stretched into the position shown in FIG. 2, such limits its service life, and operable pressure handling capacity. Thus, it is desirable to form tubular sleeve 50 of a material which is flexible, to permit displacement, but sufficiently strong to meet high pressure, high temperature applications. Pinch valve system 10 accomplishes this by providing a pair of transversely directed folds 60, 62 disposed in spaced parallel relation on opposing sides of an intermediate portion 58 of tubular sleeve 50. Thus, as the valve closing members 32, 34 are displaced toward one another and the opposing sides of intermediate sleeve portion 58 therewith, the tubular sleeve wall 51 unfolds from its previous folded configurations 60, 62 to provide the additional length required for opposing wall portions in the intermediate portion 58 of tubular sleeve 50 to be placed in contact with one another. In this manner, the fluid flow path of flow passage 52 is interrupted without requiring any substantial stretching of the sleeve wall 51.

Referring now to FIG. 6, there is shown a cross-sectional cutaway of a portion of the sleeve wall 51 formed by a pair of laminated layers 64, 66. The interior coating layer 64, provides a chemical-resistant liner for the fluid flow passage. The reinforcing layer 66 is most often formed by a material composition which is different from that of layer 64, and may include reinforcing cords or fibers 68 embedded in the resin 67. Obviously, more layers both reinforced and unreinforced may be laminated in addition to layers 64 and 66 to form the sleeve wall 51 and provide the desired mechanical strength and temperature resistance required for a particular application. While the layer 64 and 66 may be formed of various natural and synthetic rubber compounds including a silicon or other polymer compositions, which are substantially elastic, the reinforcing cords or fibers 68 are substantially inelastic and inhibit the stretching of the composite structure. Although it is possible to weave the fibers 68 to permit limited stretch of the composite material, such reduces the overall pressure carrying capacity of the tubular sleeve thus formed, as compared with a sleeve having a non-stretch weave.

Thus, by providing the transverse folds 60 and 62, sleeve 50 may be pinched closed within the valve body 20 without requiring the sleeve wall 51 to be stretched, and therefore both the service life and pressure carrying capacity are increased for a particular sleeve wall thickness and material composition. The provision of excess sleeve wall material within the folds 60 and 62 permits the overall valve length to be shorter than would otherwise be possible for a pinch valve of equal diameter and pressure carrying capacity. The reduced length of pinch valve system 10 provides great commercial advantage over prior art pinch valve systems since pinch valve 10 may be constructed with a longitudinal length dimension which is standard for ball, gate and the like type flanged valves, providing a degree of interchangeability not previously available in the marketplace for pinch valves.

Referring back to FIGS. 1 and 2, the valve body 20 is shown as being provided with a pair of interior recess openings 22, 24 for receiving respective folded portions 62, 60 of sleeve 50 therein. The provision of recesses 22 and 24 permits the sleeve 50 to be disposed within through passage 25 and in contiguous contact with the inner surface of the valve body wall 21. This arrangement permits the utilization of the through passage 25 to be maximized, which in turn permits the flow passage 52 of sleeve 50 to have a cross-sectional area which is substantially equal to the cross-sectional area of valve body through passage 25, less the cross-sectional area of the sleeve wall 51. Further, it is critically important that the valve not introduce turbulence or increase the back-pressure over that which would be produced by an equivalent length of fluid flow line. Thus, it is critically important that the folds 60 and 62 extend outwardly from the interior of the flow passage 52 so as not to form any restriction on the internal diameter of flow passage 52. The outwardly extended folds 60 and 62 are each respectively received within the respective recesses 24 and 22 of valve body 20, thereby permitting the internal cross-sectional area of flow passage 52 to be maximized.

The flow passage cross-sectional area is further maximized by providing a pair of opposing recesses 26 and 27 for receipt of the respective pressure applying portions 42, 38 of respective valve closing members 34, 32. Thus, when valve closing members 32 and 34 are in their normal fully retracted position, the pressure applying portions 38, 42 of valve closing members 32, 34 do not impinge on the cross-sectional area of flow passage 52.

Figure 8:
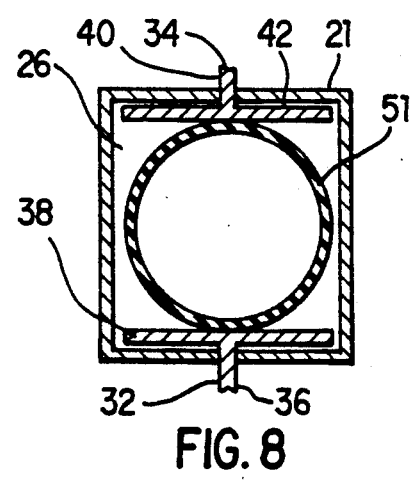

As shown in FIG. 8, recess 26 is of substantially rectangular contour to provide for the complete retraction of the pressure applying portions 38, 42 of respective valve closing members 32, 34. The rectangular contour of recess 26 permits the length of pressure applying portions 38 and 40 to extend beyond the diameter of the sleeve wall 51 to provide the desired pinching action when valve closing members 32, 34 are displaced as shown in FIG. 2.

Figure 3:
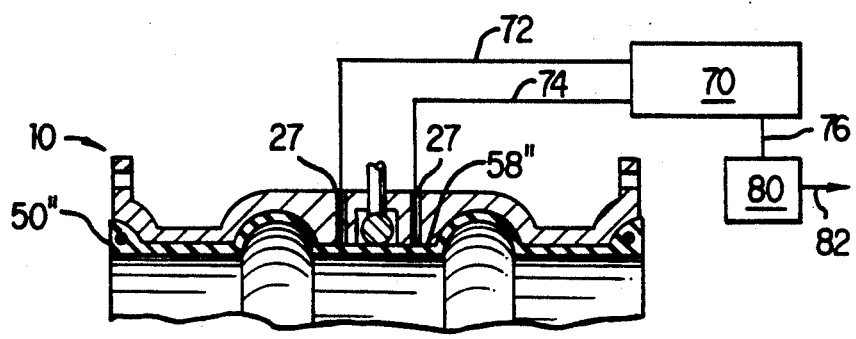
FIG. 3 is a cut-away cross-sectional view of the pinch valve system showing connection of a resistance measurement circuit.
Figure 7:
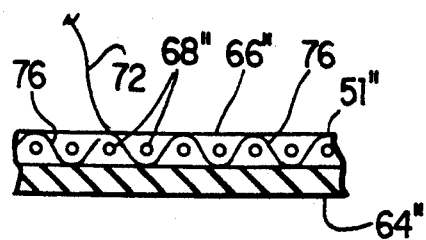
FIG. 7 is a cut-away sectional view of the flexible sleeve wall member having an electrode incorporated therein; and, FIG. 8 is a sectional view of the pinch valve system taken along the section line 8—8 of FIG. 1.

As shown in FIGS. 3 and 7, interchangeable pinch valve system 10 may be provided with a tubular sleeve 50" which incorporates electrodes for detecting deterioration of the inner coating layer 64". A pair of electrode leads 72, 74 are coupled to electrodes, which may be extensions of the electrode leads, disposed at the interface between the reinforcing layer 66" and the interior coating layer 64". The electrode 76, which may simply be an extension of the lead 72 can be interwoven between the reinforcing fibers 68", extending circumferentially at one end of the intermediate portion 58 of tubular sleeve 50. Although not shown, lead 74 would similarly be interwoven circumferentially about the opposing end of intermediate portion 58 of tubular sleeve 50 so as to form a pair of spaced parallel electrodes.

Each of leads 72 and 74 are coupled to a resistance measuring circuit 70 for measuring the resistance between the electrodes coupled to leads 72 and 74. Damage to the inner lining 64" of sleeve 50", as might be caused by cavitation, abrasion, or tearing of the layer will cause the resistance between the electrodes to change. This change in resistance is detected by the signaling circuit 80 which compares the resistance value transmitted thereto by the cable 76 with a reference value, providing an alarm output 82 responsive to a predetermined resistance change being detected. This feature provides an early warning of value failure, permitting maintenance personnel to replace the tubular sleeve prior to the occurrence of a total breach in the sleeve. In order to permit displacement of the central portion 58" of sleeve 50" each of the leads 72, 74 freely extends through respective through openings 27 formed in the wall of the valve body. Obviously, sufficient slack in lead wires 72, 74 must be provided to permit their respective movement when the valve is operated.

Figure 4:
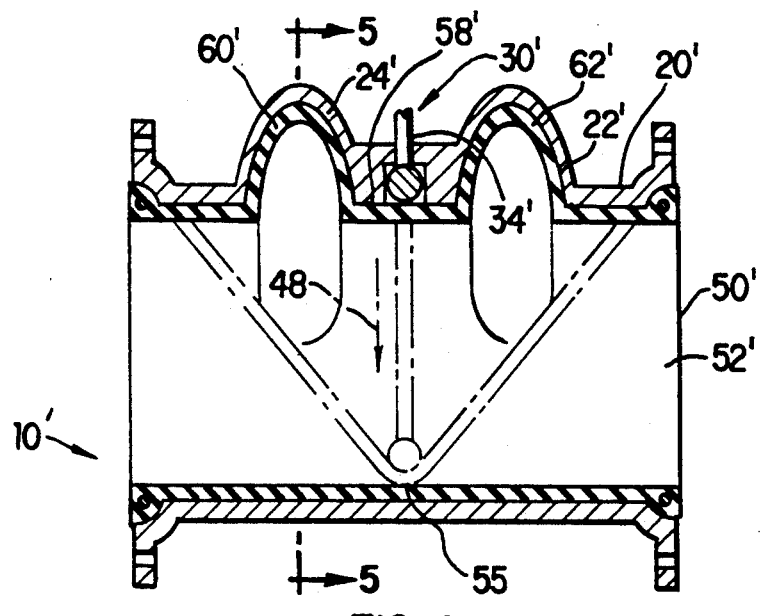
FIG. 4 is a cross-sectional plan view of an alternate configuration for the pinch valve system.
Figure 5:
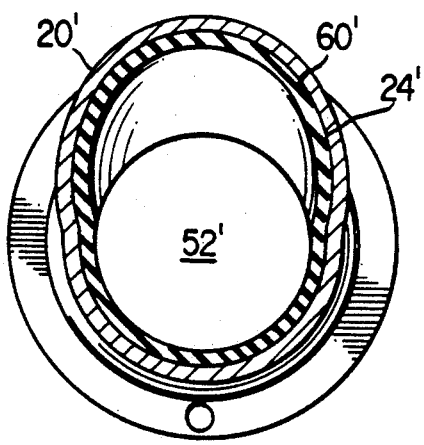
FIG. 5 is a sectional view of the pinch valve system taken along the section line 5—5 of FIG. 4.

Referring now to FIGS. 4 and 5, there is shown an alternate embodiment of the interchangeable pinch valve system. Pinch valve system 10' includes a pinch valve assembly 30' wherein a single valve closing member 34' is provided. When the valve closing member 34' is operated, the valve closing member is displaced in the direction indicated by directional arrow 48, such that one side of the intermediate portion 58' of tubular sleeve 50' is displaced to contact the opposing wall surface 55, as shown by the phantom lines in FIG. 4.

Interchangeable pinch valve system 10', like the embodiment previously discussed, is provided with a tubular sleeve 50' having a pair of folded portions 60', 62' on opposing longitudinal ends of the intermediate sleeve portion 58'. However, unlike the circular contour in the prior embodiment, folded portions 60' and 62' are semicircular, since only side of the tubular sleeve is displaced from contiguous contact with the inner wall surface of the valve body 20'. Each of the semicircular folds 60', 62' are disposed within respective semicircular recesses 24', 22' formed in valve body 20', for the same reasons as previously discussed. Thus, for applications where it is desirable to have a single valve closing member 34' the advantages of standardized length, high pressure operating capacity and long service life can be achieved without the requirement for structures which would interfere with flow through the fluid flow passage 52', or otherwise reduce the flow passage cross-sectional area.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or scope of the invention as defined in the appended claims.

What is claimed is:

1. A interchangeable pinch valve system, comprising:
   a. a valve body having a flow axis defined by a longitudinally directed through passage formed by an interior wall thereof;
   b. a tubular sleeve member being formed by a flexible tubular wall and being disposed within said valve body through passage coaxial said flow axis, said tubular sleeve member being coupled to said valve body on opposing ends thereof to define an interruptable fluid flow path therebetween; and,
   c. means for pinching an intermediate portion of said tubular sleeve member to interrupt said fluid flow path, said tubular sleeve member being in contiguous contact with said interior wall of said valve body and having a pair of outwardly extending transverse folds formed in said flexible wall on opposing longitudinal ends of said intermediate portion of said tubular sleeve member, whereby said fluid flow path can be pinched closed without substantial stretch of said tubular sleeve member flexible wall, said valve body including a pair of first recess openings formed in parallel spaced relation in said interior wall transverse said flow axis for respectively receiving said outwardly directed folds of said tubular sleeve member to thereby substantially maximize a cross-sectional area of said fluid flow path within said valve body through passage, each of said pair of first recess openings having a semicircular cross-sectional contour in a direction of said flow axis for maximizing a length dimension of each of said pair of outwardly directed folds of said tubular sleeve, thereby minimizing an overall length dimension of said tubular sleeve.

2. The interchangeable pinch valve system as recited in claim 1 where said outwardly directed folds of said tubular sleeve member are circular in cross-sectional contour transverse said flow axis direction.

3. The interchangeable pinch valve system as recited in claim 1 where said outwardly directed folds of said tubular sleeve member are semicircular in cross-sectional contour transverse said flow axis direction.

4. The interchangeable pinch valve system as recited in claim 1 where said pinching means includes at least one valve closing member disposed within said valve body, said valve closing member having a shaft portion extending through an opening formed in a wall of said valve body and a pressure applying portion for displacing a first interior wall surface of said intermediate portion of said sleeve member into contiguous contact with a second interior wall surface of said tubular sleeve member.

5. The interchangeable pinch valve system as recited in claim 4 where said valve body further includes a second recess opening formed in said interior wall transverse said flow axis for receiving said pressure applying portion of said valve closing member therein.

6. The interchangeable pinch valve system as recited in claim 1 where said tubular sleeve member includes at least an interior surface formed by a chemical-resistant coating layer laminated to a reinforcement layer throughout said overall length dimension.

7. The interchangeable pinch valve system as recited in claim 6 further comprising means for detecting damage of said coating layer formed on said interior surface of said tubular sleeve member.

8. An interchangeable pinch valve system, comprising:
   a. a valve body having a flow axis defined by a longitudinally directed through passage formed by an interior wall thereof;
   b. a tubular sleeve member being formed by a flexible tubular wall and being disposed within said valve body through passage coaxial said flow axis, said tubular sleeve member including at least an interior surface formed by a chemical-resistant coating layer laminated to a reinforcement layer, said tubular sleeve member being coupled to said valve body on opposing ends thereof to define an interruptable fluid flow path therebetween;
   c. means for pinching an intermediate portion of said tubular sleeve member to interrupt said fluid flow path, said tubular sleeve member being in contiguous contact with said interior wall of said valve body and having a pair of outwardly extending transverse folds formed in said flexible wall on opposing longitudinal ends of said intermediate portion of said tubular sleeve member, whereby said fluid flow path can be pinched closed without substantial stretch of said tubular sleeve member flexible wall; and,
   d. means for detecting damage of said coating layer formed on said interior surface of said tubular sleeve member, said detecting means includes (1) a pair of spaced electrodes disposed at an interface between said interior coating layer and said reinforcement layer, (2) means for measuring a resistance value between said pair of electrodes, and (3) signaling means electrically coupled to said resistance measuring means for indicating significant wear of said coating layer responsive to a predetermined change in said resistance value.

9. A interchangeable pinch valve system, comprising:
   a. a valve body having a flow axis defined by a longitudinally directed through passage formed by an interior wall thereof, said valve body having a pair of opposing connecting flanges formed on opposing longitudinal ends for connection in a fluid flow line;
   b. a tubular sleeve member being formed by a flexible tubular wall and being disposed within said valve body through passage coaxial said flow axis, said tubular sleeve member having integrally formed flange portions on opposing longitudinal ends thereof for coupling to respective valve body flanges; and,
   c. means for pinching an intermediate portion of said tubular sleeve member to interrupt said fluid flow path, said tubular sleeve member being in contiguous contact with said interior wall of said valve body and having a pair of outwardly extending transverse folds formed in said flexible wall on opposing longitudinal ends of said intermediate portion of said tubular sleeve member, whereby said fluid flow path can be pinched closed without substantial stretch of said tubular sleeve member flexible wall to interrupt fluid flow through said tubular sleeve member, said valve body including a pair of first recess openings formed in parallel spaced relation in said interior wall transverse said flow axis for respectively receiving said outwardly directed folds of said tubular sleeve member to thereby substantially maximize a cross-sectional area of said fluid flow path within said valve body through passage, each of said pair of first recess openings having a semicircular cross-sectional contour in a direction of said flow axis for maximizing a length dimension of each of said pair of outwardly directed folds of said tubular sleeve, thereby minimizing an overall length dimension of said tubular sleeve.

10. The interchangeable pinch valve system as recited in claim 11 where said pinching means includes at least one valve closing member disposed within said valve body, said valve closing member having a shaft portion extending through an opening formed in a wall of said valve body and a pressure applying portion for displacing a first interior wall surface of said intermediate portion of said sleeve member into contiguous contact with a second interior wall surface of said tubular sleeve member.

11. The interchangeable pinch valve system as recited in claim 10 where said valve body further includes a second recess opening formed in said interior wall transverse said flow axis for receiving said pressure applying portion of said valve closing member therein.

12. The interchangeable pinch valve system as recited in claim 9 where said tubular sleeve member has an interior surface formed by a coating layer laminated to a reinforcement layer throughout said overall length dimension.

13. The interchangeable pinch valve system as recited in claim 12 further comprising means for detecting damage of said coating layer of said tubular sleeve member.

14. An interchangeable pinch valve system, comprising:
   a. a valve body having a flow axis defined by a longitudinally directed through passage formed by an interior wall thereof, said valve body having a pair of opposing connecting flanges formed on opposing longitudinal ends for connection in a fluid flow line;
   b. a tubular sleeve member being formed by a flexible tubular wall and being disposed within said valve body through passage coaxial said flow axis, said tubular sleeve member having integrally formed flange portions on opposing longitudinal ends thereof for coupling to respective valve body flanges, said tubular sleeve member having an interior surface formed by an interior coating layer laminated to a reinforcement layer;

c. means for pinching an intermediate portion of said tubular sleeve member to interrupt said fluid flow path, said tubular sleeve member being in contiguous contact with said interior wall of said valve body and having a pair of outwardly extending transverse folds formed in said flexible wall on opposing longitudinal ends of said intermediate portion of said tubular sleeve member, whereby said fluid flow path can be pinched closed without substantial stretch of said tubular sleeve member flexible wall to interrupt fluid flow through said tubular sleeve member; and, d. means for detecting damage of said interior coating layer of said tubular sleeve member, said detecting means includes (1) a pair of spaced electrodes disposed at an interface between said interior coating layer and said reinforcement layer, (2) means for measuring a resistance value between said pair of electrodes, and (3) signaling means electrically coupled to said resistance measuring means for indicating significant wear of said coating layer responsive to a predetermined change in said resistance value.

* * * * *